April 28, 1964    W. S. TAYLOR ETAL    3,130,586
PRESSURE MEASURING APPARATUS
Filed July 13, 1960    4 Sheets-Sheet 1
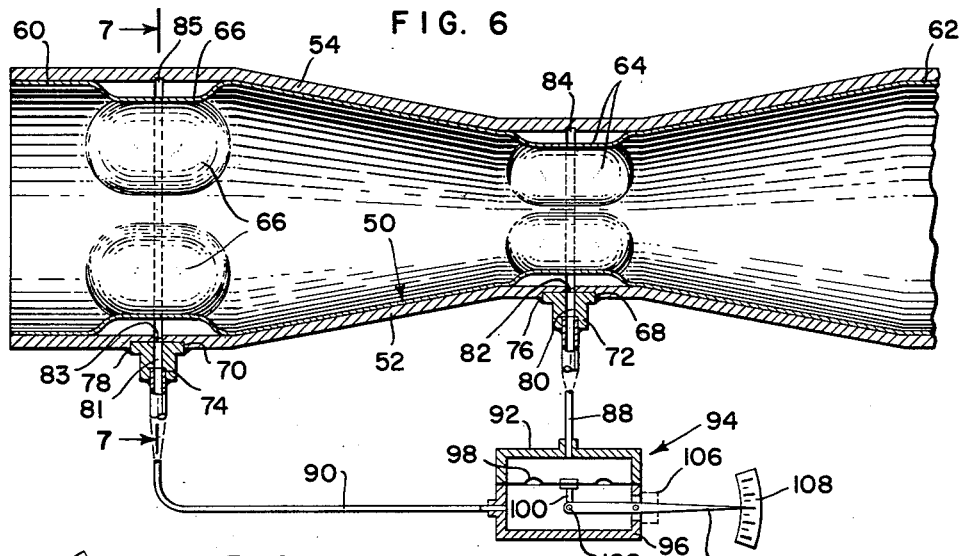
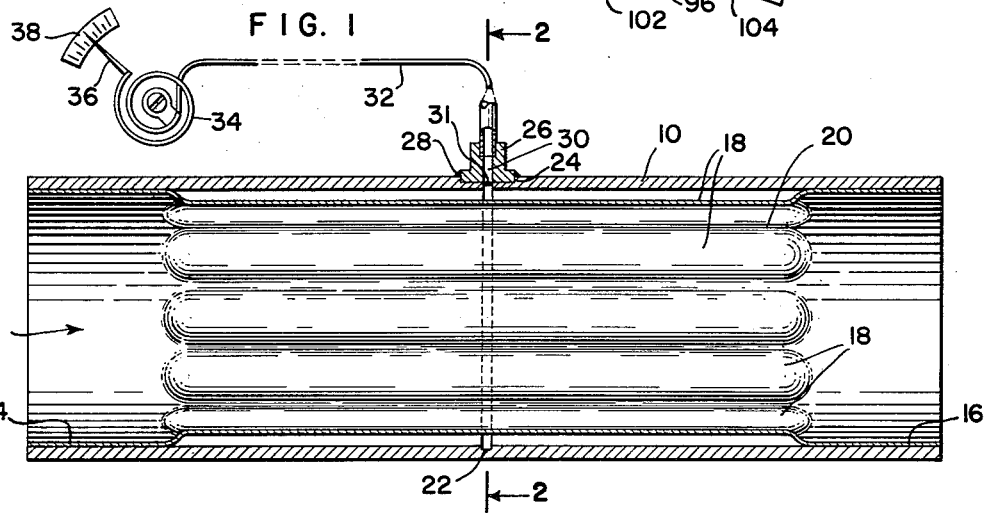
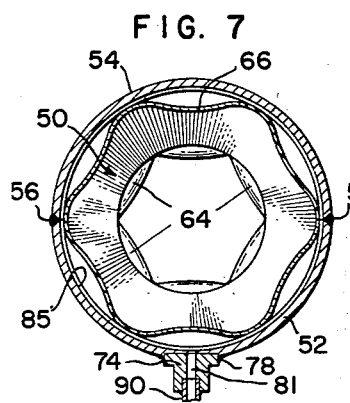
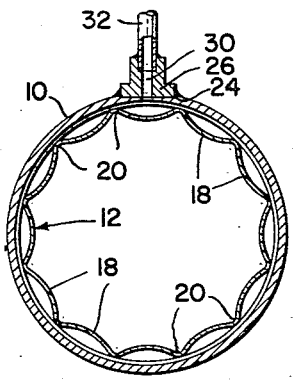
*INVENTORS.*
WILLIAM S. TAYLOR
ROBERT C. WHITEHEAD JR.
BY Arthur H. Swanson
ATTORNEY.

April 28, 1964 W. S. TAYLOR ETAL 3,130,586
PRESSURE MEASURING APPARATUS
Filed July 13, 1960 4 Sheets-Sheet 2
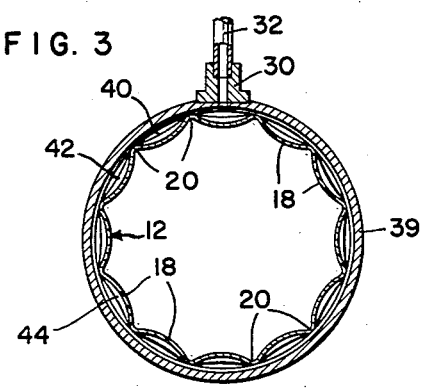
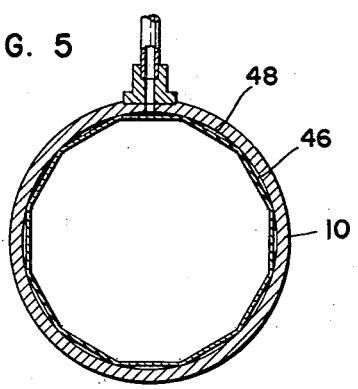
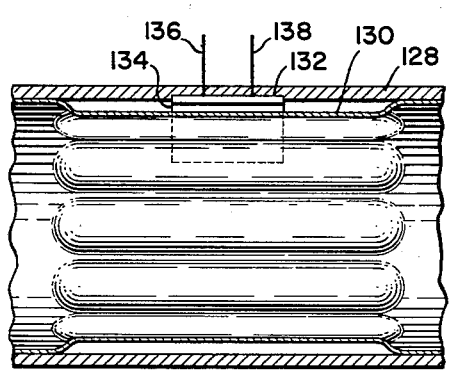
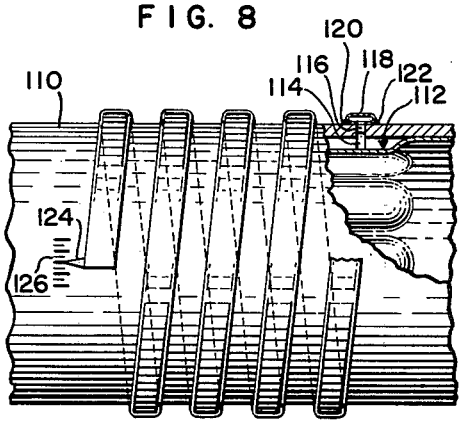
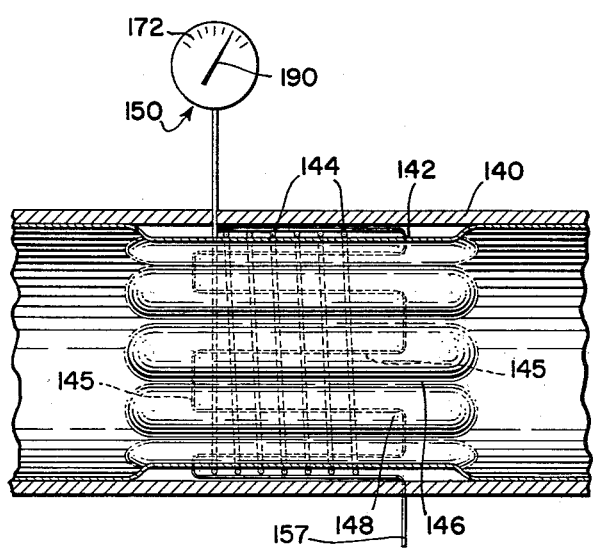
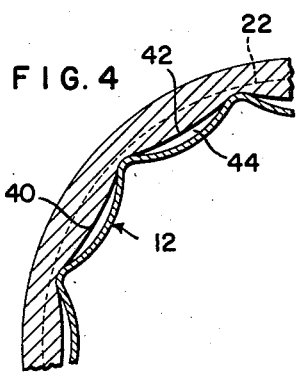
INVENTORS.
WILLIAM S. TAYLOR
ROBERT C. WHITEHEAD JR.
BY
Arthur H. Swenson
ATTORNEY.

April 28, 1964   W. S. TAYLOR ETAL   3,130,586
PRESSURE MEASURING APPARATUS
Filed July 13, 1960   4 Sheets-Sheet 3

*INVENTORS.*
WILLIAM S. TAYLOR
ROBERT C. WHITEHEAD JR.
BY Arthur H. Swanson
ATTORNEY.

April 28, 1964 W. S. TAYLOR ETAL 3,130,586
PRESSURE MEASURING APPARATUS
Filed July 13, 1960 4 Sheets-Sheet 4
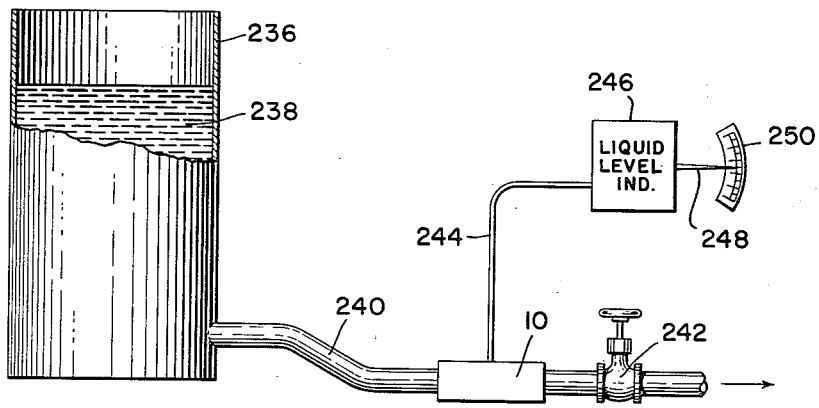
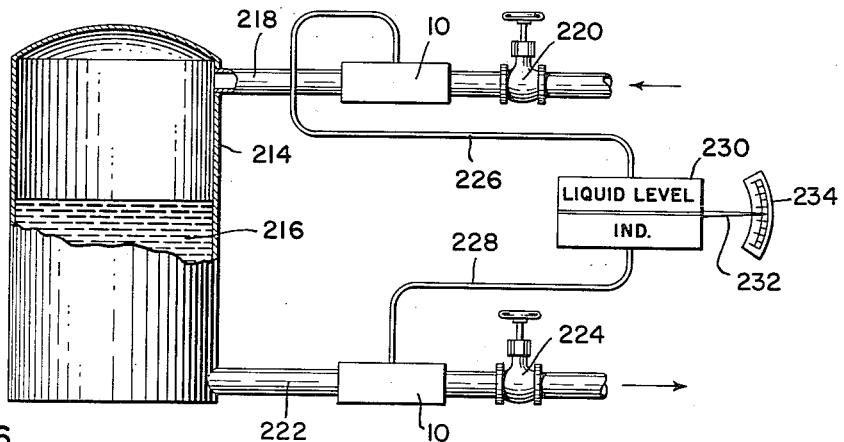
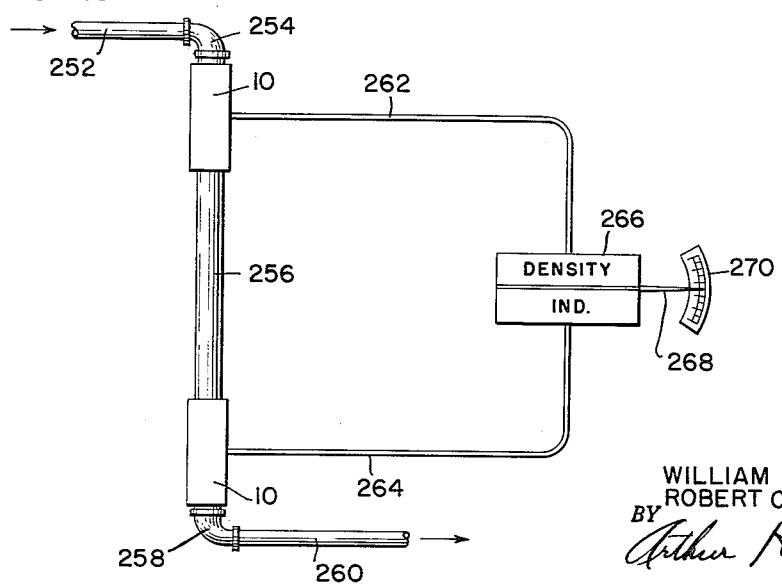
INVENTORS.
WILLIAM S. TAYLOR
ROBERT C. WHITEHEAD JR.
BY Arthur H. Swanson
ATTORNEY.

United States Patent Office 3,130,586
Patented Apr. 28, 1964

3,130,586
PRESSURE MEASURING APPARATUS
William S. Taylor, Drexel Hill, and Robert C. Whitehead, Jr., Oreland, Pa., assignors to Minneapolis-Honeywell Regulator Company, Minneapolis, Minn., a corporation of Delaware
Filed July 13, 1960, Ser. No. 42,670
6 Claims. (Cl. 73—406)

The object of the present invention is to provide an apparatus which will more accurately measure the pressure of a fluid mass within a container than has heretofore been disclosed in the prior pressure measuring art.

More specifically it is another object of the present invention to provide a pressure seal of the aforementioned type which can be employed interchangeably to measure either a pressure or flow rate of a fluid passing through a flow conduit, the density of a fluid in a flow line, or the liquid level of a fluid in an open or closed container.

More specifically, it is advantageous to employ this pressure measuring apparatus to accurately measure the pressure of a hot, luke warm or cold fluid such as milk that is passing through a flow conduit. When taking pressure measurements of this type it is necessary that the pressure of the fluid be raised to fairly high levels and at the same time it is necessary to make sure that this pressure does not become equal to or exceed the bursting pressure of the flow conduit.

Furthermore, such fluids must be required by public health laws and trade associations, for example the International Association of Milk and Food Sanitarians, Inc. to pass rigid accurate pressure as well as temperature test measurements as they are passed through such a flow line during the time they are undergoing pasteurization or other treatment in a milk processing plant.

Prior pressure measuring devices which have been required to employ very small diaphragm pressure seals within the vertical branch of a T-shaped fitting, having its other two branches forming a part of the flow conduit in order to sense the pressure of fluids of the aforementioned type, have not been satisfactory because of the following reasons: First, because these diaphragms have a low volume displacement and therefore cannot be used with a high volume displacement indicating element e.g. a The term sensitivity as it applies to a pressure seal is generally defined as being equal to the volume displacement of the pressure seal divided by the pressure change of the fluid under measurement.

In order to obtain the high degree of sensitivity that is desired these T retained diaphragms having fixed thickness must be made of a larger diameter so that they will contact a larger surface of the fluid under measurement. However, since this change necessitates the use of a larger more expensive T section it is therefore not economically feasible to increase the diameter of this diaphragm.

Greater sensitivity can also be acquired by these diaphragms by reducing the thickness of the diaphragm to an extremely thin wafer dimension. However use of extremely thin diaphragms of this type have not been found suitable because of manufacturing, assembly and in-use handling difficulties which have been encountered due to the fragile nature of these diaphragms. In this regard it should be noted that slight defects such as fine scratches or very slight pressure applied by the fingers of the person assembling these diaphragms etc. will for example make them unfit for use.

It is therefore not feasible because of the latter mentioned reasons to make them of the extremely thin wafer thickness that is desired, to obtain a greater sensitivity. This type of diaphragm seal is thus not suitable for low pressure measurements. Increased sensitivity of the cylindrical seal formed by the tube within a pipe section as will be hereinafter described in detail can, on the other hand, be acquired for any given diameter and seal wall thickness by merely increasing the length of the seal.

It is therefore another major object of the present invention to disclose a cylindrical seal which can advantageously be employed in an economical manner to pipes of any desired diameter and wall thickness to much lower pressure measurements than those which can be acquired through the use of diaphragm seals because the sensitivity of these cylindrical seals can be increased by merely increasing their length.

Where prior art diaphragm and other similar type of seals have been used it has become a necessary practice that they be frequently cleaned to make sure that bacteria and other undesirable particles have not wedged themselves to portions of the seal. Such frequent cleaning becomes a burdensome maintenance operation particularly in plants where milk is being pasteurized. It can thus be seen that it is very costly to frequently shut down a process in order to continuously maintain prior art type seals in a properly cleaned condition.

For the aforementioned reasons diaphragm and other similar type of prior art seals cannot be relied upon to satisfactorily continuously measure in a sanitary manner the true pressure reading of the pressure of a fluid passing through a flow line.

It is therefore another object of the present invention to provide a pressure measuring apparatus that eliminates the inaccurate pressure sensing noted supra by inserting a thin flexible corrugated tube into a replaceable section of a flow line pipe whose outside diameter is slightly less than the inside diameter of the pipe and whose ends are sealed to this pipe section by means of a heliarc ring weld to thereby provide a very sensitive, low gradient, corrugated tube seal.

It is another object of the present invention to provide a seal of the aforementioned type whose outer peripheral surface will expand in a desired uniform manner in an outward direction with the assurance that permanent deformation of the seal will not occur as the pressure of a fluid contacting its inner surface is increased and which will have its outer peripheral surface uniformly contracted as the aforementioned increase pressure is reduced.

Another object of the present invention is to provide a modified form of the aforementioned replaceable flow line seal for reducing the amount of fluid fill in this seal and thus reducing the ambient temperature error. This is accomplished by making the inner wall of the pipe adjacent each of the corrugations in the tube with surfaces which are shaped to conform substantially to that of the shape of the corrugations which they afront to thereby reduce the fluid fill space formed by this seal to a minimum.

Another object of the present invention is to employ the use of the aforementioned expansion and contraction of this corrugated tube to transmit a pressure through a fluid placed in the space between the tube and the inner wall of the pipe and through a capillary connected thereto to move a fluid pressure actuated flow line pressure indicator.

Another object of the present invention is to employ the use of the aforementioned expansion and contraction of the corrugated tube to transmit a pressure to a bonded strain gage that is attached to the peripheral portion of this tube and which forms a portion of a bridge circuit of a potentiometer whose output voltage varies as the magnitude of the pressure of the flow line fluid acting on the inner wall of the sleeve is varied.

A still further object of the present invention is to employ a unitary thin tube within a venturi formed in a flow conduit having a first corrugated portion of the aforementioned type extending across the neck of the venturi and a second similar but enlarged corrugated portion extending across a section of the flow conduit immediately adjacent the venturi in order to enable a suitable differential pressure instrument to accurately measure the pressure drop occurring across the large and small diametral surfaces forming the venturi in terms of the flow rate of a fluid flowing through said tube.

Another object of the invention is to employ the use of the aforementioned expansion and contraction of the corrugated tube to transmit a pressure that is proportional to this expansion and contraction by way of a fluid fill within the confines of the walls of the flow pipe section and tube to a piezoelectric crystal located within this fluid to enable an electrical signal to be sent from the crystal which will linearly increase upon an increase in the pressure of the fluid flow that is within the tube and whose signal will linearly decrease upon a decrease in the pressure of this fluid flow.

In the drawing:

FIGURE 1 discloses the heretofore described flow pipe section containing a corrugated tube therein which can be readily inserted into a flow line;

FIGURE 2 shows a cross sectional view taken along the section line 2—2 of FIGURE 1 in which the corrugations are each shown as being of a curved-shaped configuration;

FIGURE 3 is a view showing another modified form of a corrugated tube taken through a lateral cross section of the tube midway between its ends, similar to that shown in FIGURE 2, but in addition showing the flow pipe section wall as having curved corrugated surfaces thereon which approximate substantially those of the tube adjacent each of which these flow pipe corrugated surfaces afront;

FIGURE 4 shows an enlarged sectional view of a portion of the corrugated tube and corrugated flow pipe section similar to that of FIGURE 3 but which is taken along a portion which is between the left end and the central portion of the tube and flow pipe section;

FIGURE 5 is a view showing a modified form of corrugated tube whose lateral cross section is of a flat polysided configuration;

FIGURE 6 shows a thin tube positioned within a flow pipe section in the form of a venturi in which two ring portions of this tube contain corrugations;

FIGURE 7 is a cross sectional view taken along the section lines 7—7 of FIGURE 6;

FIGURE 8 shows how any one of the single sanitary corrugated pressure seal tubes disclosed supra can be combined with a helical pressure spiral to permit changes in pressure occurring within this pressure seal to be indicated on the outer wall of a flow pipe section surrounding this corrugated pressure seal tube;

FIGURE 9 shows how a piezoelectric crystal can be employed to sense changes in the expansion and contraction of the corrugated tube as the pressure of the fluid within the tube is respectively increased and decreased;

FIGURE 10 shows a bonded strain gage attached to the outer corrugated surface of the tube and in schematic form how a strain gage potentiometric instrument is employed to sense changes in the expansion and contraction of the corrugated surface of the tube;

Figure 11:
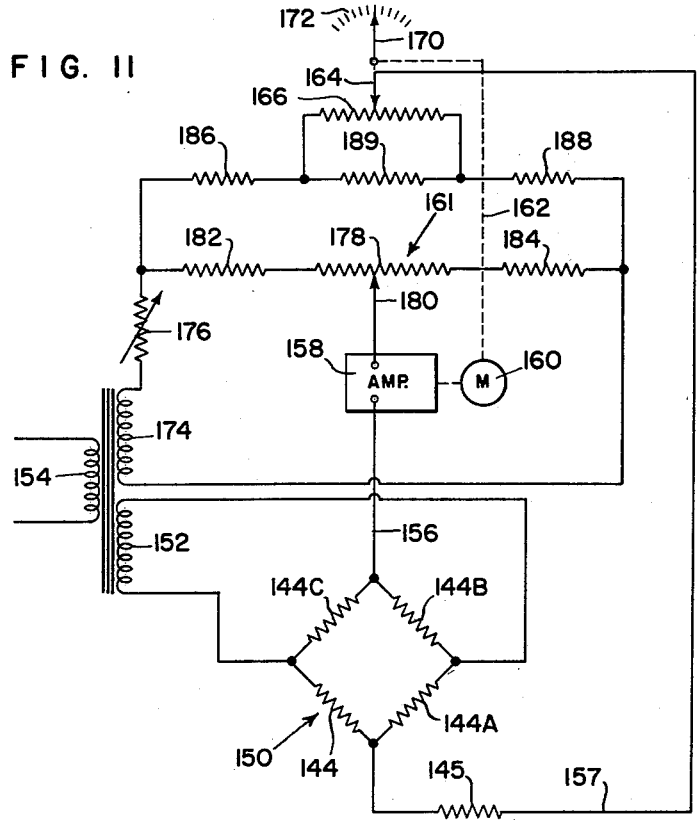
Figure 12:
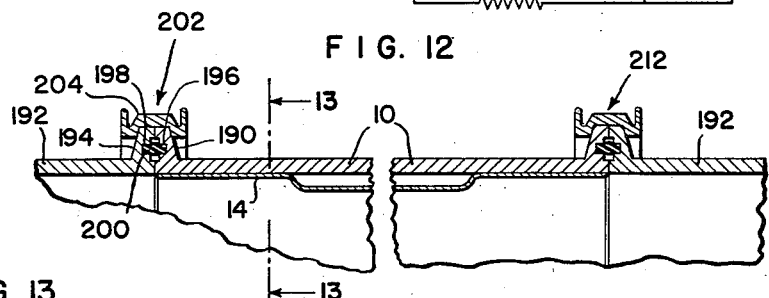
Figure 13:
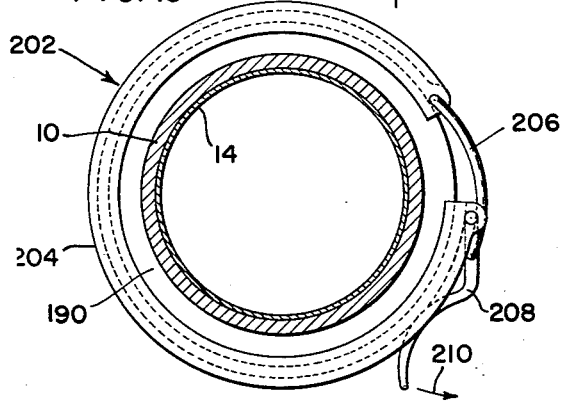

FIGURE 11 discloses the details of how changes in the electrical output of the bonded strain gage disclosed in FIGURE 10 can be used to change the resistant values of a strain gage type of bridge in a potentiometric circuit;

FIGURE 12 shows how any one of the aforementioned pipe sections containing a flexible seal therein can be inserted in a fluid process flow line;

FIGURE 13 shows how the ends of the pipe section can be inserted in and clamped to the open end of a flow conduit.

FIGURE 14 discloses how two pressure seals e.g. as shown in FIGURE 1 or 10 of the drawing can be employed to measure the liquid level of a fluid in a closed container.

FIGURE 15 discloses how a pressure seal e.g. as shown in FIGURE 1 or 10 of the drawing can be employed to measure the liquid level of a fluid in an open container and FIGURE 16 discloses how two pressure seals e.g. as shown in FIGURES 1 or 10 and 12 of the drawing can be employed to measure the density of a fluid flowing through an unrestricted pipe.

Referring now to FIGURE 1 of the drawing in detail it can be seen that there is shown a pipe section 10 which may be readily inserted into and form a part of a fluid flow line. Within the inner wall of this pipe section there is a thin wall tube 12 which has a slightly smaller outside diameter than the inside diameter of the pipe section 10 and which is preferably made of a flexible material e.g. a stainless non-corrosive steel or plastic material. The ends 14, 16 of this tube 12 are shown fixedly attached by means of a smooth heliarc weld, microbrazing or by a chemical adhesive to the inside wall of the flow line pipe section 10.

The portion of the thin wall tube 12 in FIGURES 1 and 2 extending between the inner ends of the portions 14 and 16 is disclosed as being corrugated. These corrugations are formed in the tube by inserting a multi-sided mandrel, having its outer peripheral surface formed in the shape of the type of corrugation desired, in the tube and applying a fluid pressure to the outer wall of this tube. Corrugations in the tube 12 will thus be formed which have concave valley portions 18 extending inwardly of the inner wall of the pipe section 10 and convex ridge portions 20, which are shown in FIGURE 2 in an expanded condition and immediately adjacent the inner wall of the pipe section 10.

An annular groove 22 is formed in the inner wall of the pipe section 10 to provide a passageway through all of the ridge portions 20 even under a condition in which the outer wall of the tube 12 is brought into contact with the inner wall of the pipe section 10.

An aperture 24 is shown formed by the outermost wall of the pipe section 10. An embossed sleeve 26 has its lower end positioned in this aperture and has its outer circumference welded at 28 to the outer surface of the pipe section 10. A passageway 30 is shown in communication at one of its ends with the aperture 31 and annular groove 22 and at its other end with an end of a capillary tube 32 which is shown fixedly connected to the upper end of the sleeve 26.

The other end of the tube 32 is schematically shown formed into a commercially available pressure spiral 34 having an indicator connected therewith for movement across an indicator scale 38.

A suitable pressure sensitive fluid having a low temperature coefficient of expansion, is used to fill the space between the inside diameter wall of the pipe section 10 and the thin wall tube 12, the annular groove 22, passageways 30, 31, the inside of capillary 32 and the pressure spiral 34.

FIGURE 3 of the drawing shows a tube 12 identical to that disclosed in FIGURES 1 and 2. FIGURE 3 differs from the disclosure in FIGURES 1 and 2 in that a mandrel having twelve curved sides has been pulled through the flow pipe section 10 to form a pipe section 39 having a plurality of curved surfaces for example the surfaces 40, 42. It can be seen that this arrangement advantageously provides a much smaller fill space 44 between the corrugated surfaces 40, 42 and the corrugated surfaces 20, 12 than was disclosed for the arrangement disclosed in FIGURES 1 and 2.

FIGURE 4 shows an enlarged view of the tube 12 and pipe section 39 shown in FIGURE 3 in an expanded condition and how the fill space 44 is formed between these parts for accommodating a pressure responsive fluid contained therein.

In FIGURE 5 there is shown a flat polysided thin corrugated tube 46 which can be substituted for the polysided curve type shown in FIGURES 1, 2 and 3. The flat polysided corrugations are formed in this tube by passing a flat multisided mandrel through the tube after the tube has been fixed at its end portions to the pipe section 10 into which it has been inserted. FIGURE 5 also shows how a space 48 is formed between the pipe section 10 and the tube 46 for accommodating a pressure responsive fluid contained therein.

The arrangement disclosed in FIGURES 6 and 7 is accomplished by inserting a thin flexible venturi tube 50 of the substantially elongated V-shaped configuration shown into the lower half of a semicircular pipe section 52. The upper half of the semicircular pipe section 54 is then placed over the top portion of the tube 50. The tube pipe sections are then joined together by welding at 56, 58 and a circular heliarc weld microbraze, or a chemical adhesive is used to join the ends of the tube 60, 62, 50 to the ends of the now joined together semicircular pipe section 52, 54. A mandrel having two curved polysided spaced apart walls is then inserted into the left end of the tube to form the corrugations 64, 64 in the right end of the tube and corrugations 66, 66, similar to that of the corrugation 64 but larger, in the left end of this tube 50.

Apertures 68, 70 are shown formed by the outermost wall of the pipe section 52 adjacent each of the respective corrugated tube portions 64, 66. Embossed sleeves 72, 74 are shown having their lower end portions in their respective apertures 68 and 70 and having their outer circumferential surface welded at 76, 78 to their associated outer surfaces of the pipe section 52.

Passageways 80, 81 are each shown in communication at one of their ends with their associated apertures 82, 83 which are formed in pipe section 54. It should be understood that if this pipe section 52, 54 is used in a flow line conduit where the pressure of the fluid within this flow line conduit is of a high magnitude and which will prevent fluids from flowing freely between the corrugated surfaces of each corrugated seal 64, 66 then the annular grooves 84, 85 which are aligned and in communication with their respective apertures 82, 83 formed in the pipe section wall 52, 54 will overcome this difficulty. The other ends of the apertures 82, 83 are in communication with the end of their respective capillary tubes 88, 90.

The other end of capillary tube 88 is shown in communication with the upper half portoin 92 of a differential pressure measuring chamber 94 and capillary tube 90 is shown connected to the lower half portion 96 of the differential pressure chamber 94. Between the upper and lower halves 92, 96 of this chamber 94 there is a diaphragm 98. Fixedly connected to the center of this diaphragm 98 there is a vertical link 100, the bottom portion of which is connected by means of a pivot pin 102 to one end of the differential pressure indicating pointer 104. The pointer 104 passes through a seal 106 and its pointed end is shown in alignment for movement along an indicating scale 108 to indicate the flow rate of the fluid being transmitted through the inside of the tube 50.

Although not shown it should be understood that a unitary venturi pipe section could be used in lieu of making use of the two split venturi pipe sections 52, 54 as shown in FIGURES 6 and 7. With this arrangement the unitary pipe section could be heated to expand its inside diameter. A tube having its outside diameter substantially equal to the inside diameter at the throat of this pipe section, when the pipe section is not in a heated condition, is then inserted into the pipe section while the pipe section is in the aforementioned expanded condition. Suitable forming tools and heating techniques can then be used to flare the outer ends of the tube in the conical shape shown against the inner walls of the pipe section. The ends of the tube can then be heliarc welded to the ends of the pipe section and the corrugations formed in the two sections of the tube in the same manner as that disclosed supra under the description of FIGURES 6 and 7.

It should also be understood that the aforementioned venturi pipe section could be alternately constructed by using a standard pipe reducer on either side of a straight pipe section forming the neck portion of the venturi. With this type of construction a pressure seal similar to the seal 12, disclosed in FIGURE 1, could then be inserted into the neck portion and a similar seal inserted into the largest left end section of the venturi.

It should also be understood that the pointer output motion is of a type which could readily be fed in as an input force into the type of force balance electrical control apparatus as is disclosed in either the P. E. Shafer Patent 2,847,619 or the W. J. Popowsky Patent 2,847,625.

FIGURE 8 of the drawing shows another modified pipe section 110 and corrugated tube 112 positioned therein. The corrugated tube 112 is formed in the identically same manner as that described supra for the construction of the corrugated tube 12. In the pipe section 110 there is shown an annular groove 114 inscribed therein that is identical to the groove 22 noted supra under the description of FIGURE 2.

The pipe section 110 also has an aperture 116 formed in its outer wall which is in communication at one end with the annular groove 114 and at its other end is in communication with a stationary end of a pressure actuated helix tube 118. This stationary end of the helix is fixedly connected by suitable welding material at 120, 122 to the outer surface of pipe section 110. A helical portion of the pressure actuated tube 118 extends to the left and at a postion that is spaced from the outer surface of the pipe section 110 and in a direction which is away from the fixed end of this tube.

The left end of this helical tube 118 contains a pointer 124 which is positioned to move along the indicating scale markings 126 inscribed on the pipe section 110.

It can be seen from the aforementioned description of FIGURE 8 that when the space between the tube 112 and the pipe section 110, the passageways 114, 116 and the interior of helix 118 are filled with a pressure responsive fluid that the end of the pointer 124 will be moved along the scale 126 in an up-scale direction as the pressure of a fluid passing through the inside of the corrugated tube 112 is increased and a movement along the scale 126 in a down-scale direction will occur as the pressure of this flowing fluid is decreased.

FIGURE 9 discloses another modified pipe section 128 and corrugated tube 130 retained therein. The corrugated tube 130 is formed in the identical same manner as that described supra for the construction of the corrugated tube 12. A curved substantially rectilinear slot 132 is formed by the inner wall of the pipe section and a piezoelectric crystal 134 is fixedly retained therein by any suitable commercially available cement material.

Two conductors 136, 138 connected to the crystal extend outwardly through the wall of the pipe section 128. Although not shown these conductors 136, 138 in turn can be connected to any one of a number of commercially available electrical indicating instruments which will measure the magnitude of the signal being transmitted through these conductors.

The signal being transmitted by these conductors 136, 138 is increased and decreased as the pressure of a fluid within the tube 130 is increased and decreased. An increase or decrease of this fluid pressure causes the wall of the tube 130 to respectively expand outwardly or contract inwardly. This tube expansion or contraction in turn causes the fluid positioned between the pipe section 128 and the outside diameter of the tube 130 to cause the fluid to apply a compressive force of increasing magnitude to the crystal 134 upon an increase in the tube expansion or to cause a decrease in the compressive force of the fluid that is being applied to this crystal 134 as the aforementioned contraction of this tube takes place.

FIGURE 10 discloses still another modified pipe section 140 and corrugated tube 142 retained therein which differs from the pipe section 10 and tube 12 disclosed in FIGURE 1 in that no pressure responsive fluid is present between the pipe section 140 and the tube 142 for measuring the amount of expansion and contraction taking place in the tube 142. Instead of using a sensing expansible means such as is used in the pressure responsive fluid arrangement of FIGURE 1, the arrangement shown in FIGURES 10 and 11 discloses the use of one or more strain sensitive resistance conductors 144, 144A, 144B, and 144C. Any one or all of these conductors e.g. conductor 144 may be coiled around the tube 142, as illustrated in FIGURE 10 or preferably may be in the form of known type resistant strain gage strips which may be bonded to the external surface of the tube 142, in bonded engagement with the sides and tops of the ridge portions.

In accordance with customary practice, temperature compensating coils or strain gage elements 145 preferably are bonded to the tube 142 in the valleys and parallel to the elongated corrugations to the end that such elements 145 are not subjected to physical strain as the tube 142 expands or contracts, but changes in resistance in response only to the variations in the ambient temperature.

A suitable number of the strain sensitive resistant elements 144, 144A, 144B, 144C are shown electrically connected to form the strain gage bridge 150 in FIGURE 11 of the drawing. This bridge circuit, in turn, is connected by way of the transformer coil 152 to a supply voltage provided by the primary transformer coil 154. The output of the strain gage bridge 150 shown connected by way of conductor 156 to the amplifier 158 and balancing motor circuit 160 may be of the well-known variety disclosed in the Wills Patent 2,423,540.

The A.C. output voltage derived from the strain gage bridge will vary in accordance with the expansion and contraction of the tube 142 and thereby provide a measure of a pressure within the tube. This is a highly accurate measurement and is independent of ambient temperature variations which tend to introduce inaccuracies. This A.C. output voltage is connected in opposition to the A.C. output voltage of a self-balancing bridge circuit 161. Both bridges 150 and 161 are energized by alternating current of the same frequency which may conveniently be sixty cycles per second. Any difference in the magnitude and phase relationship of the output voltages of the two bridges 150 and 161 are sensed by the amplifier 158. The amplifier 158 and motor 160 are operative through a mechanical connection 162 to move a slidewire contact 164 along the bridge resistant element 166 to a position in which the bridge is balanced. The pointer 170 connected to the slidewire contact 164 is also adjustable by the motor 160 to a position along an indicating scale 172 to provide an indication of the pressure in the tube 142.

As shown, the strain gage bridge circuit includes a transformer coil 174, a variable resistor 176 for adjusting the span of the circuit, a slidewire resistor element 178 and a slidewire contact 180 for movement along element 178 to adjust the zero setting of the circuit. Other resistance elements 182, 184, 186, 188 and 189 are connected in the circuit, as shown.

The pipe section 10 is shown in FIGURE 12 as having a left flared end portion rolled thereon in the form of a flange 190. The right end of the flow line conduit 192 against which this left end of the pipe section 10 is positioned is also shown as having a flared right end portion rolled thereon in the form of a flange 194.

The left end surface of the flange 190 and the right end surface of the flange 194 are each shown having identical circumferential slots 196, 198 formed therein.

A stainless steel snap-action spring toggle actuated clamping member 202 which may be of a commercially available type, for example, a clamp commonly referred to in the sanitary fitting trade as a Tri-Clamp may be used in the manner shown in FIGURES 12 and 13. This clamping member 202 is shown as consisting of four parts namely, the conduit snap-on ring portion 204 having an extendable rod portion 206 that is bent substantially into the form of a rectangle and a forked toggle lever 208 having one end in engagement with an end of a ring portion 204 and pivotally mounted at this end on one end of the rod portion 206. The other end of this lever 208 is shown snapped into a locked position against the outside wall of the snap ring 204.

To remove pressure of such a snap ring 204 on flanges 190 and 194 one need only insert pressure in the direction of the arrow 210. This action causes the pressure applied by ring 204 against the outer peripheral walls of the flanges 190 and 194 to be released so that these latter mentioned parts can be disconnected from one another.

The right end of the pipe section 10 which is shown connected to another portion of the flow line 192 is provided with similar flanges and a quick-disconnect clamp connection at 212 as that described supra for the left end of the readily insertible and removable pipe section 10.

It should also be understood that the other pipe sections 39; 52, 54; 128; 110; and 140 disclosed as other modified forms of pipe sections are also provided with end flanges and quick-disconnect clamp connections similar to those described supra for the pipe section 10 in order to make them also readily insertible and removable from a flow line conduit.

FIGURE 14 schematically discloses an enclosed container 214 containing a fluid 216 and a first flow conduit 218. The first flow conduit contains a valve 220 and a rigid pipe section 10 which has a corrugated tube, not shown, therein that forms a flexible seal. The rigid pipe section 10 is inserted and contained as a portion of the flow conduit 218 in the same manner as that shown in FIGURE 12 for the pipe section 10 and seal 14 in flow column 192.

FIGURE 14 also discloses a second flow conduit 222 containing a valve 224 and also a rigid pipe section 10 inserted in the conduit 222 in a manner similar to the rigid pipe section 10 in a flow conduit 218 described supra.

Capillary tubes 226, 228 are each shown respectively connected at one end with the flexible seal referred to supra that is within the inner wall of each of their associated pipe section 10, 10 and are in communication that their other respective ends with a differential pressure measuring apparatus 230 whose interior is similar to the differential pressure measuring apparatus 94 as shown in FIGURE 6 of the drawing. A pointer 232 extending from the differential pressure measuring apparatus 230 is shown positioned for movement along a fixed indicating scale 234 which is similar to the arrangement shown in FIGURE 6.

From the aforementioned description of FIGURE 14 it can thus be seen that by placing the fixed pipe sections 10, 10 in the respective flow conduits 218 column 222 a differential pressure reading on scale 234 can readily be taken which will indicate the true head and level of the liquid 216 in the enclosed container 214.

FIGURE 15 schematically discloses an open container 236 containing a fluid 238 and a flow conduit 240, which may be a suction conduit, having its longitudinal center line in alignment with the bottom surface of the container 236. This flow conduit 240 is shown containing a valve 242 and a rigid pipe section 10 which has a corrugated tube, not shown herein, which forms a flexible seal. This rigid pipe section 10 is inserted and retained as a portion of the flow conduit 240 in the same manner as shown in FIGURE 12 for the pipe section 10 and seal 14 in flow conduit 192.

A capillary tube 244 is shown having one of its ends in communication with the flexible seal within the inner wall of the pipe section 10 and in communication at its other end with a well-known type of liquid level pressure actuated indicating instrument 246.

A pointer 248 connected and forming a part of this indicating instrument 246 is shown connected for movement along a fixed indicating scale 250.

From the aforementioned description of FIGURE 15 it can thus be seen that by placing the pipe section 10 in the flow conduit 240 a pressure reading on scale 250 can be readily taken which will indicate the true head and level of the fluid in the open container 236.

FIGURE 16 schematically discloses an inlet pipe 252, a reducing elbow 254, a vertically positioned conduit 256 having two spaced apart rigid pipe sections 10, 10 which each have a corrugated tube, not shown therein, which forms a flexible seal. Each of these rigid pipe sections 10 are inserted and retained as a portion of the flow conduit 256 in the same manner as that shown in FIGURE 12 for the pipe section 10 and seal 14 in flow conduit 192.

Located at the lower end of the conduit 256 there is shown a second reducing elbow 258 and an outlet pipe 260. Capillary tubes 262, 264 are shown respectively at one end in communication with the flexible fluid referred to supra that is within the inner wall of each of the pipe sections 10, 10 and are in communication at their other respective ends with a differential pressure measuring apparatus 266 whose interior is similar to the differential pressure measuring apparatus 294 shown in FIGURE 6 of the drawing.

A pointer 268 extending from the differential pressure measuring apparatus 266 is shown positioned for movement along a fixed indicating scale 270.

From the aforementioned description of FIGURE 16 it can thus be seen that by placing the fixed spaced-apart pipe sections 10, 10 in the vertical position conduit 256 that is of a larger diameter in the inlet and outlet conduit 252, 260 that a differential pressure reading on scale 270 can readily be taken which will indicate the density of the fluid flow passing through the vertical conduit 256.

From the aforementioned description of FIGURES 1–16 it can be seen that a flow line pipe section is disclosed that contains a very sensitive but sturdy sanitary pressure seal which meets all the rigid sanitary requirements of the food and milk industries which may readily be inserted into or removed from a food, dairy or other industrial flow line to continuously measure in an accurate rapid manner the pressure, fluid flow rate or liquid level of the fluid passing therethrough.

What is claimed is:

1. An apparatus to accurately measure the magnitude of the pressure of a fluid flowing through a flow pipe, comprising a rigid pipe section adapted to be inserted as a part of said flow pipe, said pipe section having a thin elongated flexible tube of the same length as said rigid pipe section positioned within said rigid pipe section, said tube being of a slightly smaller outside diameter than an inside diameter of said pipe section, said flexible tube having its outer end portions fixedly connected to the inner circumferential end portions of said pipe section to form a flexible seal between the flowing fluid and said rigid pipe section, a portion of said flexible tube positioned between the end portions of said tube having a plurality of elongated corrugations therein and said flexible corrugated portion of said tube and the surrounding inner wall of said pipe section adjacent thereto providing a liquid-filled pressure seal through which the magnitude of the pressure of the fluid flowing through said flow pipe is transmitted to a pressure actuated receiving instrument.

2. The fluid pressure measuring apparatus as defined in claim 1 wherein said pressure actuated receiving instrument is comprised of a flat fluid-filled pressure indicating spiral tube having one end communicating with said seal and its other end operably positioned for movement along a pressure indicating scale.

3. An apparatus to accurately measure the magnitude of the pressure of a fluid flowing through a flow pipe, comprising a rigid pipe section adapted to be inserted as a part of said flow pipe, said pipe section having a thin elongated flexible tube of the same length as said rigid pipe section positioned within said rigid pipe section, said tube being of a slightly smaller outside diameter than an inside diameter of said pipe section, said flexible tube having its outer end portions fixedly connected to the inner circumferential end portions of said pipe section to form a flexible seal between the flowing fluid and said rigid pipe section, a portion of said flexible tube positioned between the end portions of said tube having a plurality of elongated corrugations therein, the inner wall of said pipe section having a circumferential groove formed therein between the ends of said pipe section to provide a continuously open passageway about the outer circumferential portion of said tube containing the portion having the corrugations therein, and said last-mentioned tube portion, and the surrounding inner wall of said pipe section adjacent thereto providing a liquid-filled pressure seal through which the magnitude of the pressure of the fluid flowing through said flow pipe is transmitted to a pressure actuated receiving instrument.

4. An apparatus to accurately measure the magnitude of the pressure of a fluid flowing through a flow pipe, comprising a rigid pipe section adapted to be inserted as a part of said flow pipe, said pipe section having a thin elongated flexible tube of the same length as said rigid pipe section positioned within said rigid pipe section, said tube being of a slightly smaller outside diameter than an inside diameter of said pipe section, said flexible tube having its outer end portions fixedly connected to the inner circumferential end portions of said pipe section to form a flexible seal between the flowing fluid and said rigid pipe section, a portion of the flexible tube and inner wall of said pipe section positioned between their respective end portions having a plurality of matched minutely spaced apart elongated corrugations therein and said corrugations in said tube and pipe section adjacent thereto providing a liquid-filled pressure seal through which the magnitude of the pressure of the fluid in said flow pipe is transmitted to a pressure actuated receiving instrument.

5. An apparatus to accurately measure the magnitude of the pressure of a fluid flowing through a flow pipe, comprising a rigid pipe section adapted to be inserted as a part of said flow pipe, said pipe section having a thin elongated flexible tube of the same length as said rigid pipe section positioned within said rigid pipe section, said tube being of a slightly smaller outside diameter than an inside diameter of said pipe section, said flexible tube having its outer end portions fixedly connected to the inner circumferential end portions of said pipe section to form a flexible seal between the flowing fluid and said rigid pipe section, a portion of the flexible tube and inner wall of said pipe section positioned between their respective end portions having a plurality of matched corrugations, said corrugations having elongated convex ridge portions and concave valley portions therein in and said corrugations in said tube and pipe section adjacent thereto providing a liquid-filled pressure seal through which the magnitude of the pressure of the fluid in said flow pipe is transmitted to a pressure actuated receiving instrument.

6. An apparatus to accurately measure the magnitude of the pressure of a fluid flowing through a flow pipe, comprising a rigid pipe section adapted to be inserted as a part of said flow pipe, said pipe section having a thin elongated flexible tube of the same length as said rigid pipe section positioned within said rigid pipe section, said tube being of a slightly smaller outside diameter than an inside diameter of said pipe section, said flexible tube having its outer end portions fixedly connected to the inner circumferential end portions of said pipe section to form a flexible seal between the flowing fluid and said rigid pipe section, a portion of said flexible tube positioned between the end portions of said tube having a plurality of elongated flat polysided corrugations therein and said corrugations in said tube and the surrounding inner wall of said pipe section adjacent thereto providing a liquid-filled pressure seal through which the magnitude of the pressure of the fluid in said flow pipe is transmitted to a pressure actuated receiving instrument.

References Cited in the file of this patent

UNITED STATES PATENTS

| | | |
|---|---|---|
| 177,269 | Nicholas | May 9, 1876 |
| 1,195,736 | Rohm | Aug. 22, 1916 |
| 1,652,941 | Isaac | Dec. 13, 1927 |
| 2,451,604 | Barnes | Oct. 19, 1948 |
| 2,729,730 | Brady | Jan. 3, 1956 |
| 2,747,408 | Boytim et al. | May 29, 1956 |